US012493126B1

(12) United States Patent
Cohen

(10) Patent No.: US 12,493,126 B1
(45) Date of Patent: Dec. 9, 2025

(54) HIGH-PERFORMANCE GNSS USING A LEO CONSTELLATION SPECTRUM UNDERLAY

(71) Applicant: AIRBUS U.S. SPACE & DEFENSE, INC., Arlington, VA (US)

(72) Inventor: Clark Emerson Cohen, Arlington, VA (US)

(73) Assignee: AIRBUS U.S. SPACE & DEFENSE, INC., Arlington, VA (US)

( * ) Notice: Subject to any disclaimer, the term of this patent is extended or adjusted under 35 U.S.C. 154(b) by 0 days.

(21) Appl. No.: 18/858,969

(22) PCT Filed: Apr. 25, 2023

(86) PCT No.: PCT/US2023/066149
§ 371 (c)(1),
(2) Date: Oct. 22, 2024

(87) PCT Pub. No.: WO2023/212536
PCT Pub. Date: Nov. 2, 2023

Related U.S. Application Data

(60) Provisional application No. 63/334,274, filed on Apr. 25, 2022.

(51) Int. Cl.
*G01S 19/42* (2010.01)
*G01S 19/25* (2010.01)
(Continued)

(52) U.S. Cl.
CPC .......... *G01S 19/425* (2013.01); *G01S 19/258* (2013.01); *G01S 19/393* (2019.08); *G01S 19/43* (2013.01); *G01S 19/46* (2013.01)

(58) Field of Classification Search
CPC .... G01S 19/425; G01S 19/393; G01S 19/258; G01S 19/43; G01S 19/46
See application file for complete search history.

(56) References Cited

U.S. PATENT DOCUMENTS

| 5,812,961 A | 9/1998 | Enge et al. |
| 5,944,770 A | 8/1999 | Enge et al. |

(Continued)

OTHER PUBLICATIONS

International Search Report for PCT/US2023/066149, mailed Jul. 19, 2023, 4 pages.

(Continued)

*Primary Examiner* — Cassi J Galt
(74) *Attorney, Agent, or Firm* — Nixon & Vanderhye P.C.

(57) ABSTRACT

A global, rapid acquisition, centimeter-level accuracy, high-integrity, space-based positioning service for autonomous ground vehicles, unmanned aerial vehicles (UAS), air taxis, all-weather aircraft precision landing, precision agriculture, and offshore machine control is presented. Low Earth orbit (LEO) constellations of satellites are a means to enhance medium Earth orbit (MEO) global satellite navigation systems (GNSS). An efficient spectrum broadcast "underlay" that enables users to access LEO carrier phase signals and their broad applications. User equipment employs coherent feed forward of the MEO GNSS ambiguous solution to recover the LEO carrier phase broadcast via robust coherent signal processing gain. Subsequently, the LEO carrier phase residuals enable rapid resolution of the unknown carrier phase biases to yield rapid acquisition of high-performance user positioning.

9 Claims, 5 Drawing Sheets

(51) Int. Cl.
    *G01S 19/39*           (2010.01)
    *G01S 19/43*           (2010.01)
    *G01S 19/46*           (2010.01)

(56) References Cited

U.S. PATENT DOCUMENTS

| | | |
|---|---|---|
| 6,373,432 B1 | 4/2002 | Rabinowitz et al. |
| 8,160,572 B2 | 4/2012 | Bovet |
| 11,073,622 B2 | 7/2021 | Cohen |
| 11,226,416 B1 | 1/2022 | Pullen et al. |
| 2011/0210889 A1* | 9/2011 | Dai ................. G01S 19/235 |
| | | 342/357.29 |
| 2016/0011318 A1 | 1/2016 | Cohen |

OTHER PUBLICATIONS

Written Opinion of the ISA for for PCT/US2023/066149, mailed Jul. 19, 2023, 7 pages.
Written Opinion of the IPEA for PCT/US2023/066149, mailed Feb. 20, 2024, 8 pages.
International Preliminary Report on Patentability with Amended Claims for PCT/US2023/066149, dated May 10, 2024, 17 pages.
Kassas Zak et al., "UC Irvine UC Irvine Previously Published Works Title Enter LEO on the GNSS Stage: Navigation with Star link Satellites", Inside GNSS, Nov. 1, 2021, pp. 1-12, XP093060861.
Psiaki et al. "Extended Kalman Filter Methods for Tracking Weak GPS Signals", ION GPS 2002, Sep. 24-27, 2002 (15 pages).

\* cited by examiner

HIGH-PERFORMANCE GNSS USING A LEO CONSTELLATION SPECTRUM UNDERLAY

RELATED APPLICATION

This application is the U.S. national phase of International Application PCT/US2023/066149, filed Apr. 25, 2023, which designated the U.S. and claims priority to U.S. provisional patent application 63/334,274, filed Apr. 25, 2022, the entire contents of each of which are hereby incorporated by reference.

TECHNICAL FIELD

The invention is in the technical field of global navigation satellite system (GNSS) carrier phase-based positioning.

BACKGROUND

Today, satellite navigation offers increasing capability for safety of life machine control applications. Nevertheless, in the field of global, centimeter-level accuracy performance, there is room for improvement. What is needed is affordable capability for global, rapid acquisition of centimeter-level positioning and tight levels of integrity. Integrity in GNSS is the capability of providing timely warnings to the user when the navigation service should not be used.

Satellite-based navigation is traditionally challenged with maintaining tight limits on integrity. High accuracy with integrity is needed, for example, for autonomous vehicles to provide "where-in-lane" positioning and for aircraft while operating within a few meters of the ground.

Real-time kinematic (RTK) positioning currently provides centimeter-level accuracy using a dense network of ground reference stations. Although acquisition can be as short as a few seconds, RTK does not readily provide integrity. RTK also requires expensive ground infrastructure that cannot practically be deployed globally.

Satellite-based precise point positioning (PPP) provides high accuracy, centimeter-level, service on a nearly global basis, except for the polar regions. PPP typically takes 10-15 minutes to converge on a solution and can sometimes take up to 40 minutes to converge. Furthermore, PPP does not provide intrinsic solution integrity.

The planned European Galileo High Accuracy Service (HAS) will provide a global positioning error of less than two decimeters in nominal conditions. The convergence time is projected to typically be less than 300 seconds. HAS is not planned to provide integrity. Furthermore, RTK, PPP, and HAS generally require specialized precision user equipment.

U.S. Pat. No. 6,373,432 ("System Using LEO Satellites for Centimeter-Level Navigation"), and U.S. Pat. Nos. 5,812,961 and 5,944,770 ("Method and Receiver Using a Low Earth Orbiting Satellite Signal to Augment The Global Positioning System") disclose using low Earth orbit (LEO) satellites for rapid acquisition of accuracy. Limitations of the technology disclosed in these patents include operation only within a confined geographical region. U.S. Pat. No. 11,073,622 ("An Improved Performance and Cost Global Navigation Satellite System Architecture") describes LEO constellations of satellites providing extended performance enhancement of GNSS positioning, including affordable application on a global basis.

SUMMARY

Spectrum is a key limitation in the use of GNSS satellites. The spectrum bands assigned to these satellites are tightly regulated and crowded by many users and satellites. Accessing the GNSS spectrum bands for new applications is difficult. There is a need for a practical means to access GNSS spectrum bands to enable high-performance LEO-based positioning applications.

The invention may be embodied to provide a GNSS carrier phase-based positioning system that provides high accuracy with integrity. The invention may be suited to providing a system that quickly and accurately determines a position of a vehicle, while also providing integrity information. The invention may be adapted to a full range of machine control or autonomous systems, including vehicles operating on the ground, in the air (airborne) and on water (marine). The invention may be embodied to access the global performance benefits of LEO satellite constellations applied to GNSS positioning, especially rapid acquisition of accurate position with integrity. The invention may enable limited-availability spectrum to be brought into use for high-performance positioning using LEO satellite constellations.

The invention may also be embodied to enable improved performance within the existing installed base of GNSS user equipment. For example, features to implement the invention may be included in modifications made to new and existing GNSS user receiver firmware and/or software to enable LEO enhanced capability.

The invention may be embodied to provide a GNSS positioning system with an integrity framework for ground vehicles and aircraft. For example, tight levels of user safety of life integrity can be expressed in terms of not exceeding a horizontal alert limit (HAL) of 1 meter with a probability less than or equal to 10-7 over an exposure time of 30 seconds and a time-to-alert of one second. This integrity definition is consistent with providing "where-in-lane" positioning for an autonomous ground vehicle. Similar tight integrity limits can be established in three dimensions for aircraft, including air taxis and unmanned aerial systems (UAS). The invention may enable a GNSS to meet these tight integrity limits affordably.

A prominent barrier to be overcome for high-performance LEO-enhanced GNSS relates to spectrum restrictions. The invention may be embodied to enable LEO satellite broadcasts to operate with a lower power flux density than that traditional GNSS satellites. Broadcasting at a lower power flux density may be used by a LEO satellite constellation to comply with regulatory spectrum restrictions. Similarly, the invention may also be embodied to enable LEO-enhanced GNSS to make more effective use of the LEO power flux density allowed by regulations.

The invention may be embodied to leverage LEO and medium Earth orbit (MEO) satellite carrier phase signals for precision ranging. Received carrier phase signals provide a precision to a small fraction of a wavelength, such as at or substantially 0.5 cm RMS (root mean square) at the L1 frequency now used for GPS.

Carrier phase measurements alone are not sufficient to provide accurate positioning information. To improve the accuracy of the positioning information, carrier phase biases must be estimated and applied in the calculations to determine receiver position. Carrier phase bias is the constant, continuously modeled component of carrier phase signal delay formed by the integer cycle ambiguity plus the receiver hardware contribution.

The invention may be embodied to implement two concurrent processing steps to estimate the carrier phase biases. By estimating the carrier phase biases, the invention may be enabled to obtain rapid, high-integrity, centimeter-level accuracy for positioning determinations.

In a first step, an estimate is made of a user receiver position and a clock bias in the receiver using signals from MEO satellites without initial knowledge of the actual carrier phase biases of LEO satellites. In the first step, code-based pseudo-ranges are used to initialize the solution. The initialized receiver position estimate is biased, precise to the centimeter-level (typically 0.5 to 3 cm), and accurate to the meter level (typically 1 to 2 m). The MEO carrier phase solution is used to calculate a feed forward profile of the carrier phase of each LEO satellite. In other words, before the LEO satellite carrier is received or processed by the user device, the invention enables the receiver to predict nearly the full attributes of the incoming LEO satellite signals, including precise range, effectively subject only to an unknown carrier phase bias of the LEO satellite signal. This capability is readily implemented despite user device dynamics and clock variation. Because the user position is already known to a meter or two, the unknown LEO carrier phase biases change slowly enough to track. The user receiver device can apply significant coherent signal processing gain to the incoming LEO satellite signals.

In a second step, LEO satellite carrier phase residuals, robustly measured during the first step by the user device, provide the key to resolving the carrier phase biases for both the MEO and LEO satellites. Knowing the carrier phase biases enables precise relative positioning of the user receiver device. The relative positioning is translated to an accurate absolute positioning of the user receiver device.

For medium Earth orbit (MEO) satellites, the line of sight to each satellite from a user receiver stays effectively motionless on time scales of minutes. MEO satellites orbit in medium Earth orbits. In contrast to MEO satellites, the lines of sight from a user receiver to LEO satellites undergo large changes quickly, on the order of tens of seconds. Profiles of the LEO satellite carrier phase residuals, precisely measured to approximately 0.5 cm, quickly reveal the MEO position bias. Along with an accurate solution, a high-integrity solution is also provided.

The invention enables the LEO satellite signals to be broadcast at a power flux density as much as 20 dB or more below the nominal GNSS level or nominal level of MEO satellites. Accordingly, the invention can be used to create an efficient, e.g., low power flux density, spectrum broadcast "underlay" that enables users to access LEO carrier phase signals and their broad applications.

The invention may be embodied as a global navigation satellite system (GNSS) receiver (102, 104, 106, 108, 110) comprising at least one processor configured to:
  track (146, 150, 154, 158, 162) the medium Earth orbit (MEO) carrier phase (166) for signals received from at least one MEO satellite (112);
  initialize (164) a receiver position estimate, clock bias estimate, and at least one MEO carrier phase bias estimate for the at least one MEO satellite (216) using code-based signals received from the at least one MEO satellite;
  calculate (174, 180) at least one feed forward carrier phase (190) for at least one low earth orbit (LEO) satellite (114) using the at least one MEO carrier phase, the receiver position estimate, clock bias estimate, and the at least one MEO carrier phase bias estimate;
  reconstruct (142) at least one LEO carrier phase signal (264) for the at least one LEO satellite;
  apply coherent signal processing gain (196, 200) to the difference (194) between the at least one LEO carrier phase signal and the corresponding at least one feed forward carrier phase to form at least one LEO carrier phase residual (206); and
  refine (164) the receiver position estimate and the at least one MEO carrier phase bias estimate for the at least one MEO satellite (216) using the at least one MEO carrier phase and the at least one LEO carrier phase residual.

The at least one processor may be further configured, for the case where the receiver position is known to be static.

The at least one processor may be further configured, wherein an inertial measurement unit (IMU) is a basis for updating the receiver position.

The at least one processor may be further configured, wherein a stable frequency standard is a basis for updating the receiver clock bias.

The at least one processor may be further configured, wherein an inertial measurement unit (IMU) is a basis for updating the receiver position, and a stable frequency standard is a basis for updating the receiver clock bias.

The at least one processor is further configured to receive data indicating ephemerides (208) of the one or more LEO satellites.

The at least one processor may be further configured, wherein the receive data is from a 5G network.

The invention may be embodied by a global navigation satellite system (GNSS) receiver (102, 104, 106, 108, 110) comprising at least one processor configured to:
  track (146, 150, 154, 158, 162) the medium Earth orbit (MEO) carrier phase (166) for signals received from at least four MEO satellites (112);
  initialize (164) a receiver position estimate, clock bias estimate, and at least four MEO carrier phase bias estimates for the at least four MEO satellites (216) using code-based signals received from the at least four MEO satellites;
  calculate (174, 180) at least one feed forward carrier phase (190) for at least one low earth orbit (LEO) satellite (114) using the at least four MEO carrier phases, the receiver position estimate, clock bias estimate, and the at least four MEO carrier phase bias estimates;
  reconstruct (142) at least one LEO carrier phase signal (264) for the at least one LEO satellite;
  apply coherent signal processing gain (196, 200) to the difference (194) between the at least one LEO carrier phase signal and the corresponding at least one feed forward carrier phase to form at least one LEO carrier phase residual (206); and
  refine (164) the receiver position estimate and the at least four MEO carrier phase bias estimates for the at least four MEO satellites (216) using the at least four MEO carrier phases and the at least one LEO carrier phase residual.

The invention may be embodied by a global navigation satellite system (GNSS) receiver (102, 104, 106, 108, 110) comprising at least one processor configured as an extended Kalman filter to:
  track (146, 150, 154, 158, 162) the medium Earth orbit (MEO) carrier phase (166) for signals received from at least four MEO satellites (112);
  recall (164) an a posteriori receiver position estimate, clock bias estimate, and at least four MEO carrier phase bias estimates for the at least four MEO satellites (216);
  calculate (174, 180) at least one feed forward carrier phase (190) for at least one low earth orbit (LEO) satellite (114) using the at least four MEO carrier phases, the receiver position estimate, clock bias estimate, and the at least four MEO carrier phase bias estimates;

reconstruct (142) at least one LEO carrier phase signal (264) for the at least one LEO satellite;

apply coherent signal processing gain (196, 200) to the difference (194) between the at least one LEO carrier phase signal and the corresponding at least one feed forward carrier phase to form at least one LEO carrier phase residual (206); and refine (164) the receiver position estimate and the at least four MEO carrier phase bias estimates for the at least four MEO satellites (216) using the at least four MEO carrier phases and the at least one LEO carrier phase residual.

The invention may be embodied as a global navigation satellite system (GNSS) receiver (102, 104, 106, 108, 110) comprising at least one processor configured to:

externally accept or internally recall (220) a receiver position, clock bias, and carrier phase bias estimate (228);

calculate (220) nominal carrier phases for MEO satellite signals (266) and one or more LEO satellite signals (268) based on the receiver position, clock bias, and carrier phase bias estimate;

form (150, 192) carrier phase residuals (270, 272) from the signals of the MEO satellites and the one or more LEO satellites versus the nominal carrier phases for the MEO satellite signals and the one or more LEO satellite signals, respectively;

apply coherent integration (154, 196) to the carrier phase residuals and sustained coherent integration (226) to the carrier phase residuals of the one or more LEO satellites; and combine (220) the integrated carrier phase residuals from the MEO satellites and the one or more LEO satellites (260, 262) to refine the receiver position estimate (228).

The at least one processor may be further configured to implement the receiver position, clock bias, and carrier phase bias estimates as states in an extended Kalman filter.

The at least one processor may be further configured wherein the externally accepted state is derived from the refined receiver position estimate and the at least one MEO carrier phase bias estimate of the scalar user receiver architecture.

DETAILED DESCRIPTION

The invention may be embodied to include space, ground, and user segments.

System Architecture

Figure 1:
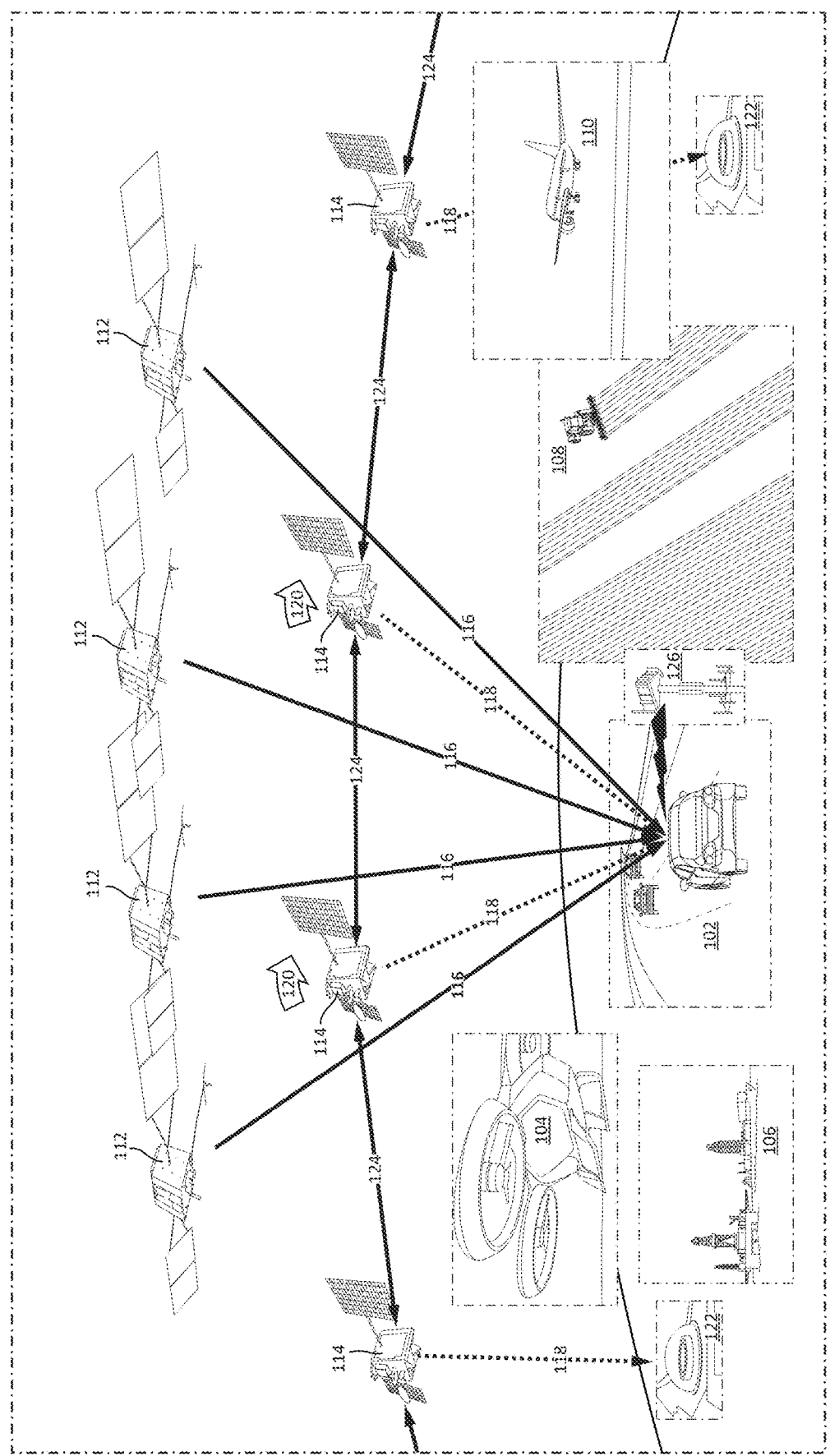
FIG. 1 depicts a system-level view of an embodiment of the invention.

FIG. 1 shows a system-level diagram of the architecture. The global system combines LEO and MEO constellations of satellites, and provides a ground segment, space segment, and user segment, to support several high-performance practical applications for users.

The user 102 is depicted as an autonomous automobile, although users could just as easily be an air taxi 104, offshore platform 106, farm tractor 108, or airliner 110. Four or more GNSS medium Earth orbit (MEO) satellites 112 are typically in range of the user and broadcast standard timing and ranging MEO signals 116 to the user. These MEO signals include a sinusoidal carrier phase component. Two or more LEO satellites 114 are typically in range of the user along with their associated broadcast timing and ranging LEO signals 118. These LEO signals also include a sinusoidal carrier phase component. Each LEO satellite carries a clock, the stability of which is a system design parameter.

The arrow in FIG. 1 associated with each LEO satellite signifies the rapid motion 120 crucial to the short convergence times. LEO satellite clocks and ephemerides are calibrated in real time using a network of reference stations 122 located at surveyed locations. Timing and ranging crosslinks 124 among the LEO satellites may also be employed in an embodiment of the invention. A nearby cellular base station data link 126 broadcasts satellite clock and ephemeris data to the user. Depending on the end-user application, the data link may also be VHF (for aircraft all-weather precision landing), or satellite based (for agriculture or offshore platforms), for example.

To facilitate LEO broadcasts being accepted from a regulatory perspective, the LEO satellite broadcast power flux density is backed off, e.g., reduced, by a significant amount with respect to GNSS to form a spectrum "underlay." The power flux density backoff, $\epsilon$, may be at or substantially 10 dB, although the architecture possesses the flexibility for this value to range from as little as a few dB, such as 2 dB to 5 dB, to up to 20 dB or more, pursuant to regulatory constraints. To represent the backed off broadcast power flux density, the LEO paths 118 to the user are shown in the figure as dotted lines.

Representative LEO Broadcast

Figure 2:
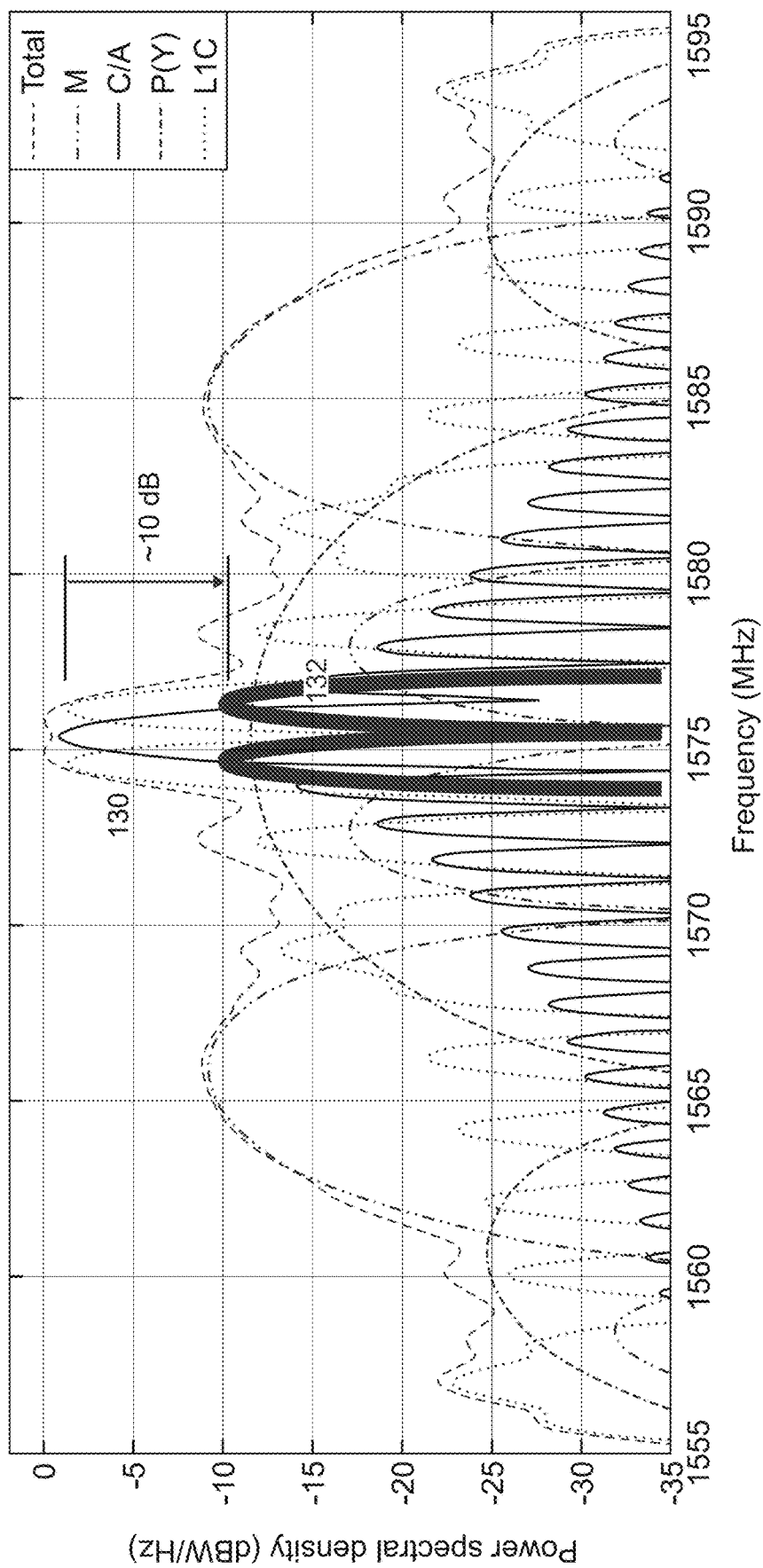
FIG. 2 shows the existing GPS spectrum at L1 (centered at 1,575.42 MHz). Superimposed is a representative reduced power flux density LEO satellite signal.

FIG. 2 depicts a representative example of the GPS power spectral density 130, specifically L1. A 10 dB backoff is superimposed with an assumed binary offset carrier BOC (1,1) signal 132. Spectrum is crowded within the GPS band and other bands useable by LEO and/or MEO GNSS satellites. The implication of a LEO constellation of satellites running at full power on a global basis is that the power flux density would be raised significantly, creating additional interference for existing GNSS satellites. However, with the lower power flux density "underlay" established by the backoff, there is negligible new interference created. The signal 132 may include a dataless pilot carrier modulated by a pseudo-random noise (PRN) code. Aggregating over an entire LEO constellation of satellites, the net signals 132 would be non-interfering.

Scalar User Receiver Architecture

Figure 3:
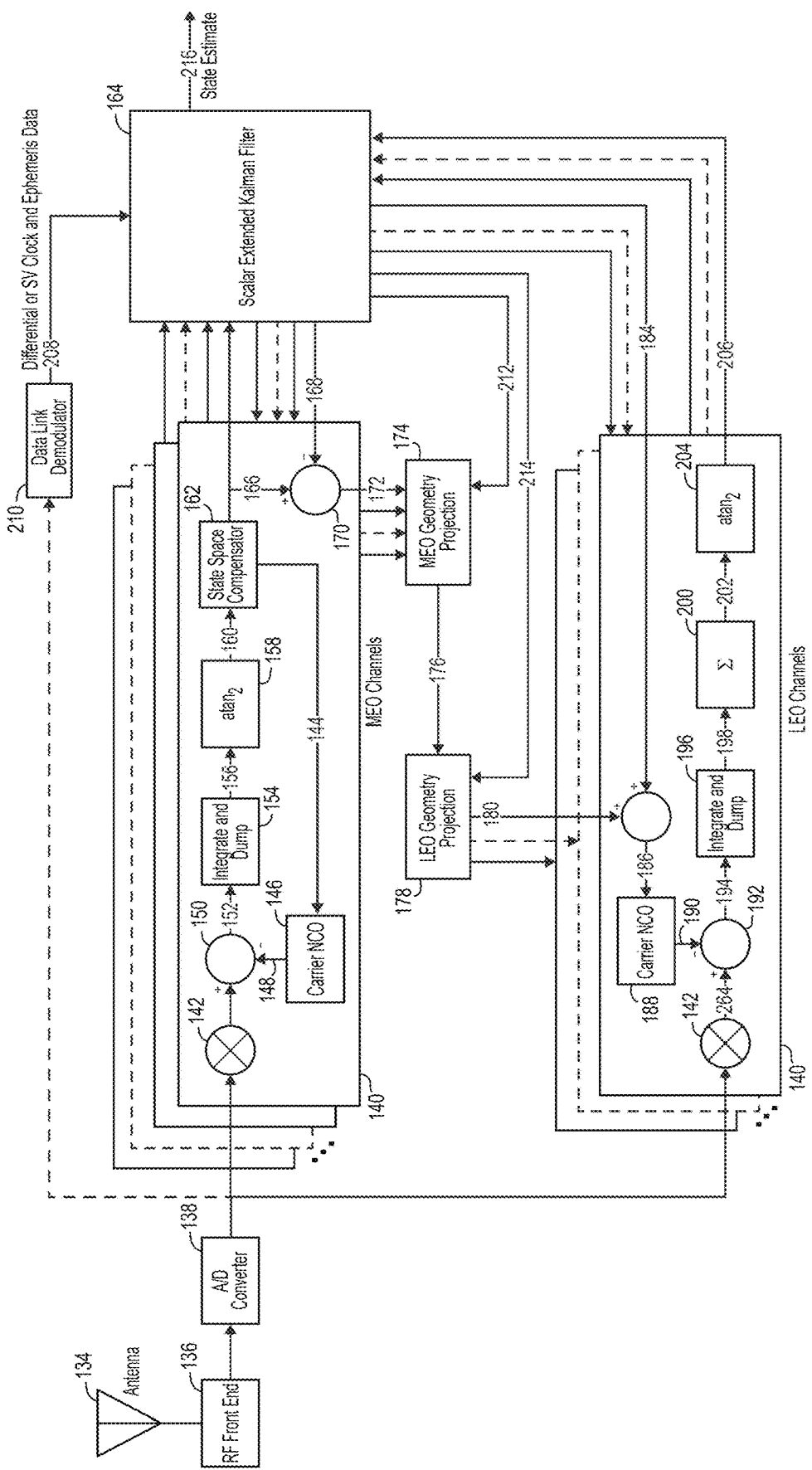
FIG. 3 provides a block diagram of a scalar LEO and GNSS receiver adapted to implement the invention.

FIG. 3 depicts the scalar receiver architecture including a global navigation satellite system (GNSS) receiver (102, 104, 106, 108, 110) comprising at least one processor configured to:

track (146, 150, 154, 158, 162) the medium Earth orbit (MEO) carrier phase (166) for signals received from at least one MEO satellite (112);

initialize (164) a receiver position estimate, clock bias estimate, and at least one MEO carrier phase bias estimate for the at least one MEO satellite (216) using code-based signals received from the at least one MEO satellite;

calculate (174, 180) at least one feed forward carrier phase (190) for at least one low earth orbit (LEO) satellite (114) using the at least one MEO carrier phase, the receiver position estimate, clock bias estimate, and the at least one MEO carrier phase bias estimate;

reconstruct (142) at least one LEO carrier phase signal (264) for the at least one LEO satellite;

apply coherent signal processing gain (196, 200) to the difference (194) between the at least one LEO carrier phase signal and the corresponding at least one feed forward carrier phase to form at least one LEO carrier phase residual (206); and refine (164) the receiver position estimate and the at least one MEO carrier phase bias estimate for the at least one MEO satellite (216) using the at least one MEO carrier phase and the at least one LEO carrier phase residual.

To converge rapidly on accurate user position with integrity, the receiver concurrently implements: (1) a feed forward coherent signal processing gain from the received MEO satellite signals to the received LEO satellite signals and (2) a carrier phase bias estimation for both the LEO and MEO satellite signals based on the LEO satellite carrier phase residual.

The LEO and MEO signal processing channels share the same antenna 134, radio frequency (RF) front end 136, and an analog-to-digital (A/D) converter 138. For many applications, it may be feasible to implement the needed user equipment changes in firmware and/or software using existing hardware. In such cases, each signal processing channel 140 may be repurposed to accommodate the LEO spectrum underlay. Following with a scalar receiver implementation, each MEO channel independently tracks an incoming signal. Punctual (PRN) code wipe-off and de-spreading occurs via mixer 142. PRN code delay lock loops are implied and not explicitly shown in the diagram for clarity and to emphasize that the high-performance positioning is carried out fundamentally using the carrier rather than the code.

The timing and ranging channels shown may be capable of receiving one, two, or several frequencies. In conjunction with receiving two or more frequencies, the user equipment may be operated within a global yet sparse network of reference stations. Multi-frequency operation enables ionosphere error to be eliminated. Residual troposphere error may also be estimated.

The numerically controlled oscillator (NCO) 146 generates a carrier reference signal 148 based on digital commands 144. The complex mixer 150 is depicted as a summing junction to represent its practical role as a carrier phase differencing function. The integrate and dump register 154 sums the incoming in-phase and quadrature samples 152 into an accumulated output 156. The integrate and dump register provides for operation at 100 Hz at nominal MEO GNSS signal levels. The atan$_2$ discriminator 158 forms a phase tracking error signal 160. At the designer's discretion, the discriminator architecture for the MEO satellites can accommodate data stripping for full carrier reconstruction or retain data symbols. The state space compensator 162 performs two functions. First, the compensator for each MEO channel optimally steers its associated NCO via 144 to null out the tracking error. Second, the compensator conveys to the scalar extended Kalman filter 164 sequential representations of the carrier phase 166 for each MEO channel.

The extended Kalman filter contains an observation model that outputs a prediction 168 of each MEO satellite range plus the MEO bias state. This quantity is subtracted from the measured carrier phase by summing junction 170 to form the linearized carrier phase pseudorange of each MEO satellite 172. The MEO geometry block 174 projects the linearized MEO pseudoranges into the position domain, outputting a feed forward relative position and receiver clock bias solution 176. The LEO satellite line of sight block 178 then projects the position domain linearized solution into the range domain for each LEO satellite to comprise the feed forward signal 180. Via summing junction 182, the feed forward correction is added to the observation model's prediction of nominal LEO range 184. The resulting predicted LEO carrier phase 186 is used to drive each LEO channel NCO 188. Each LEO NCO output 190 is down-converted to baseband via complex mixer 192.

At this point, the mixer output is comprised of a nearly constant phase error signal 194 with an amplitude backoff of νε. The extent of the residual phase profile, expected in general to be slowly rotating, indicates the extent of the position error of the MEO satellite position solutions. The error signal is accumulated via an integrate-and-dump registers 196 to produce an intermediate baseband error profile 198. A supplemental summation stage 200 is implemented in software. The summation stage (1) addresses integrate-and-dump register overflow for existing GNSS receivers and (2) further extends the time integration of the intermediate baseband error profile nominally by the reciprocal of the backoff, E. The summation stage also acts as a low-pass filter. At this point in the channel processing chain, an atan$_2$ discriminator 204 converts each in-phase and quadrature error profile 202 to a phase angle error profile 206, which become observables for the extended Kalman filter.

The designer has discretion over the sample rates employed. A scalar architecture favors establishing the MEO tracking and LEO feed forward sample rate at 100 Hz, synchronous with the symbol rate of many modern GNSS signals. Each MEO tracking and LEO feed forward time step, m, comprises an interval of 10 ms. Then, the extended Kalman filter is set to scale with the inverse of the backoff, E. For example, the extended Kalman filter can be set to run at 10 Hz for a backoff of 10 dB (10 counts per state update) and 1 Hz for a backoff of 20 dB (100 counts per state update).

For each time step, M, of interval 0.1 seconds, the extended Kalman filter state, $x_M$, comprises a space where x is the (3×1) residual user position, $\dot{x}$ is the (3×1) residual user velocity, t is the user receiver clock bias, $\dot{t}$ is the user receiver frequency offset, $b^{MEO}$ is the (J×1) vector of MEO carrier phase biases, where J is the number of MEO satellites being tracked, and $b^{LEO}$ is the (K×1) vector of LEO carrier phase biases, where K is the number of LEO satellites being tracked.

$$x_M = \begin{bmatrix} x \\ \dot{x} \\ t \\ \dot{t} \\ b^{MEO} \\ b^{LEO} \end{bmatrix}_M$$

The discrete plant model is given as $$x_{M+1} = \Phi x_M + w_M$$

where for time step $\Delta t$ the state transition matrix, $\Phi$, is given as $$\Phi = \begin{bmatrix} \begin{bmatrix} I & \Delta t\, I \\ 0 & I \end{bmatrix} & 0 & 0 & 0 \\ 0 & \begin{bmatrix} 1 & \Delta t \\ 0 & 1 \end{bmatrix} & 0 & 0 \\ 0 & 0 & I & 0 \\ 0 & 0 & 0 & I \end{bmatrix}$$

The noise model for the position, velocity, and clock states is adapted from Brown and Hwang, *Introduction to random signals and applied Kalman filtering*, 4th ed., Wiley and Sons, 2012, Section 9.3. The overall noise model is then completed as follows:

$$Q_M = \mathcal{E}\{w_M w_M^T\} =$$

$$\begin{bmatrix} \begin{bmatrix} S_p \frac{\Delta t^3}{3} I & S_p \frac{\Delta t^2}{2} I \\ S_p \frac{\Delta t^2}{2} I & S_p \Delta t\, I \end{bmatrix} & 0 & 0 & 0 \\ 0 & \begin{bmatrix} S_f \Delta t + S_g \frac{\Delta t^3}{3} & S_g \frac{\Delta t^2}{2} \\ S_g \frac{\Delta t^2}{2} & S_g \Delta t \end{bmatrix} & 0 & 0 \\ 0 & 0 & S_b \Delta t\, I & 0 \\ 0 & 0 & 0 & S_b \Delta t\, I \end{bmatrix}$$

where the various S variables are spectral amplitudes, and the clock parameters are given by Allan deviation coefficients as follows:

$$S_f \sim \frac{h_0}{2}$$

$$S_g \sim 2\pi^2 h_{-2}$$

The observation model is given by $$z_M = h(x_M) + v_M$$

Where $z_M$ is the observation vector comprised of MEO carrier phase measurements, $\phi_j^{MEO}$, and LEO carrier phase residuals, $\delta\varphi_k^{LEO}$, as follows:

$$z_M = \begin{bmatrix} \phi_1^{MEO} \\ \phi_2^{MEO} \\ \vdots \\ \phi_J^{MEO} \\ \delta\varphi_1^{LEO} \\ \vdots \\ \delta\phi_K^{LEO} \end{bmatrix}_M$$

In the case of multiple-frequency user measurements associated with sparse reference station networks and long distances to reference stations, the channels comprising the one or more different user frequencies may be combined into ionosphere-free observables. The linearized observation equations for the MEO satellites are:

$$\phi_{jm} \cong r_{jm} - \hat{r}_{jm}^T \delta x_m + t_m + b_j^{MEO} + e_{jm}^{troposphere} + e_{jm}^{multipath} + e_{jm}^n$$

where $r_{jm}$ is the nominal satellite range, $\hat{r}_{jm}^T$ is the line of sight vector from the user to satellite j at epoch m, $\delta x_m$ is the linearized user position, $e_{jm}^{troposphere}$ is the residual troposphere error, $e_{jm}^{multipath}$ is the multipath error, and $e_{jm}^n$ is the receiver noise error. The carrier phase biases have no epoch dependency because they are assumed to be constant. State estimation models may be implemented for residual troposphere error and multipath. Satellite clock and ephemeris errors may largely be removed by applying solutions 208 from the ground segment network via data link demodulator 210. The input to the demodulator is shown as a dashed line because it may share the timing and ranging antenna or employ a dedicated antenna.

The prediction of each MEO satellite feed forward pseudorange 172 is computed by the observation model as the quantity $$\phi_{jm}^{ff} \cong -\hat{r}_{jm}^T \delta x_m + t_m + e_{jm}^n$$

The output for each channel is stacked into the following expression $$\begin{bmatrix} \phi_1^{ff} \\ \phi_2^{ff} \\ \vdots \\ \phi_J^{ff} \end{bmatrix}_m \cong \begin{bmatrix} -\hat{r}_1^T & 1 \\ -\hat{r}_2^T & 1 \\ \vdots & \vdots \\ -\hat{r}_J^T & 1 \end{bmatrix}_m \begin{bmatrix} \delta x \\ t \end{bmatrix}_m + \begin{bmatrix} e_1^n \\ e_2^n \\ \vdots \\ e_J^n \end{bmatrix}_m$$

In matrix and vector shorthand, the same expression is written as follows:

$$\phi_m^{ff} \cong \begin{bmatrix} -R^T & 1 \end{bmatrix}_m \begin{bmatrix} \delta x \\ t \end{bmatrix}_m + e_m^n$$

where $R \equiv [\hat{r}_1\ \hat{r}_2\ \ldots\ \hat{r}_J]$ and $1 \equiv [1\ 1\ \ldots\ 1]^T$. Given the assumed MEO estimated carrier phase biases, we can now solve for the user relative position and clock. Defining $H \equiv [-R^T\ 1]$, then the Moore-Penrose pseudoinverse of H is $H^+ = (H^T H)^{-1} H^T$. The matrix R 212 is calculated by and conveyed from the extended Kalman filter. Then, the MEO geometry block 174 is given by $$\begin{bmatrix} \delta x \\ t \end{bmatrix}_m \cong \begin{bmatrix} -R^T & 1 \end{bmatrix}_m^+ (\phi_m^{ff} - e_m^n)$$

The feed forward user position is biased by the amount the MEO carrier phase biases are in error, but the user receiver is able to estimate the relative position and clock even under dynamics. The receiver can now predict the LEO phase measurement residual at each epoch.

For the LEO satellite line of sight block 178, the MEO feed forward user position and clock 176 is pre-multiplied by $[-\hat{s}_k^T\ 1]_m$, the projection of the solution space into the specific LEO satellite. The matrix S 214 is calculated by and conveyed from the extended Kalman filter. The feed forward LEO satellite signals 180, $\varphi_m^{ff}$, are then given by $$\varphi_m^{ff} = \begin{bmatrix} \varphi_1^{ff} \\ \vdots \\ \varphi_K^{ff} \end{bmatrix}_m =$$

$$\begin{bmatrix} -\hat{s}_1^T & 1 \\ \vdots & \vdots \\ -\hat{s}_K^T & 1 \end{bmatrix}_m \begin{bmatrix} \delta x \\ t \end{bmatrix}_m = \begin{bmatrix} -S^T & 1 \end{bmatrix}_m \begin{bmatrix} \delta x \\ t \end{bmatrix}_m \cong \begin{bmatrix} -S^T & 1 \end{bmatrix}_m \begin{bmatrix} -R^T & 1 \end{bmatrix}_m^+ (\phi_m^{ff} - e_m^n)$$

The supplemental summation stage 200 then integrates the feed forward LEO satellite signal over G time steps, where $G \approx \epsilon^{-1}$, such that $$\varphi_M^{ff} = \sum_{m=(M-1)G+1}^{MG} \varphi_m^{ff} \cong \sum_{m=(M-1)G+1}^{MG} [-S^T \ 1]_m [-R^T \ 1]_m^+ \phi_m^{ff}$$

At this point, the full MEO and LEO observable set can be assembled at each time step M.

$$\phi_{jM} \cong r_{jm} - \hat{r}_{jM}^T \delta x_M + t_M + b_j^{MEO} + e_{jM}^{troposphere} + e_{jM}^{multipath} + e_{jM}^n$$

$$\phi_{kM} \cong r_{km} - \hat{r}_{kM}^T \delta x_M + t_M + b_k^{LEO} + e_{kM}^{troposphere} + e_{kM}^{multipath} + e_{kM}^n$$

Once the feed forward architecture captures the LEO phase angle error profile 206, the combined set of MEO and LEO observables, $z_M$, for the extended Kalman filter is available for measurement updates. As the LEO satellite line-of-sight geometry, S, changes rapidly for the user, it tends to span all three spatial dimensions. The carrier phase bias estimates for both the MEO and LEO satellites converge, and all filter states converge accordingly toward centimeter-level positioning. The product of the user equipment is the state estimate output 216.

Vector User Receiver Architecture

Figure 4:
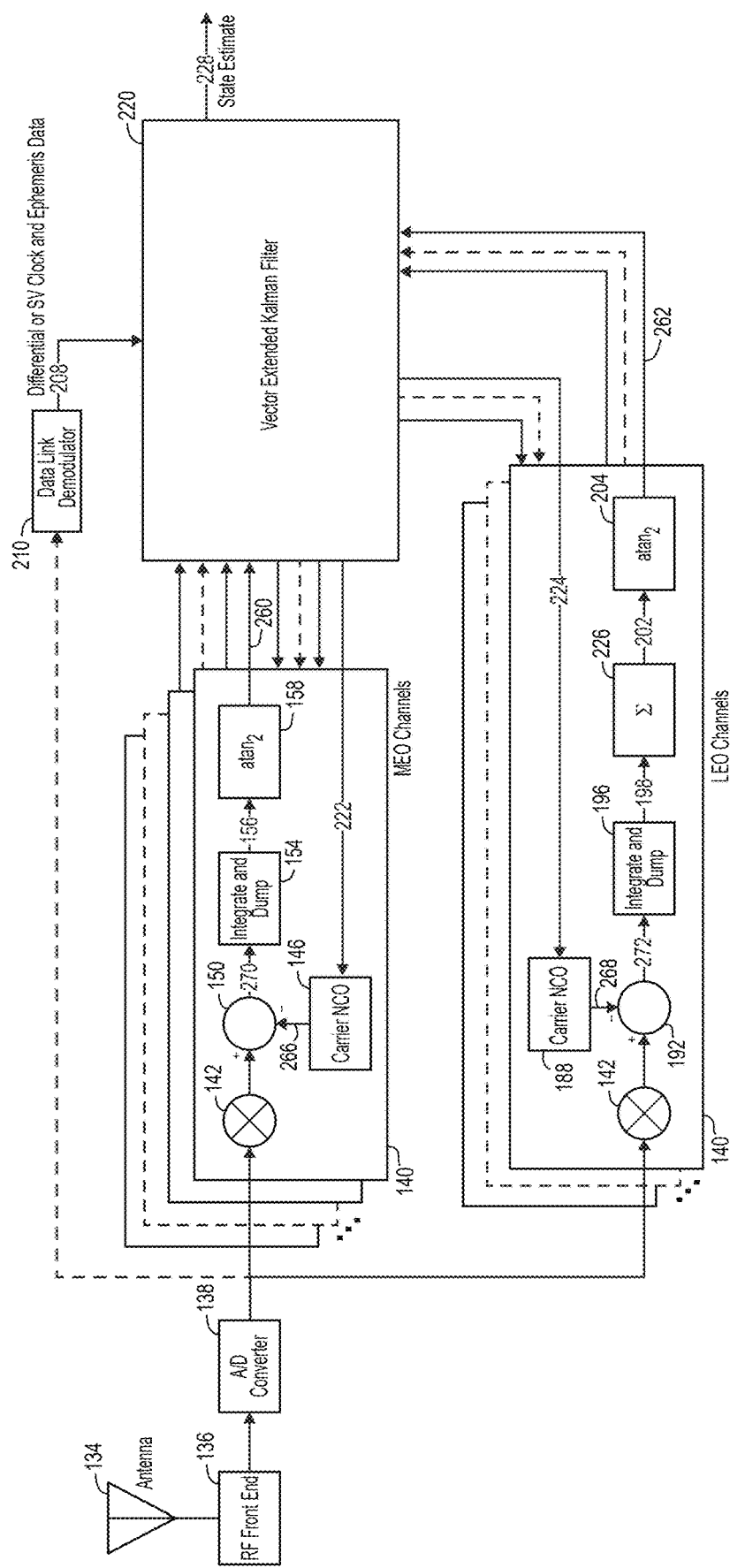
FIG. 4 provides a block diagram of a vector LEO and GNSS receiver implementing the invention.

FIG. 4 depicts a vector implementation of a receiver. Unlike the scalar architecture of FIG. 3 where the tracking loops operate in the range domain, the vector architecture operates largely in the position domain.

The invention may be embodied as a global navigation satellite system (GNSS) receiver (102, 104, 106, 108, 110) comprising at least one processor configured to:

externally accept or internally recall (220) a receiver position, clock bias, and carrier phase bias estimate (228);

calculate (220) nominal carrier phases for MEO satellite signals (266) and one or more LEO satellite signals (268) based on the receiver position, clock bias, and carrier phase bias estimate;

form (150, 192) carrier phase residuals (270, 272) from the signals of the MEO satellites and the one or more LEO satellites versus the nominal carrier phases for the MEO satellite signals and the one or more LEO satellite signals, respectively;

apply coherent integration (154, 196) to the carrier phase residuals and sustained coherent integration (226) to the carrier phase residuals of the one or more LEO satellites; and combine (220) the integrated carrier phase residuals from the MEO satellites and the one or more LEO satellites (260, 262) to refine the receiver position estimate (228).

Advantages of a vector tracking receiver over the scalar implementation in the context of the LEO underlay are: (1) the ability to operate at lower MEO carrier-to-noise ratio as the number of MEO satellites increases, and (2) for a given MEO carrier-to-noise ratio, the ability to continue tracking under increased dynamics. A vector tracking receiver may be able to withstand momentary gaps in coverage by one or more satellites, although carrier phase inconsistencies among satellites may cause a vector tracking receiver to lose lock. Also, a vector tracking receiver generally requires scalar tracking for initialization purposes.

The update rate of both loop closure and state estimation is implemented uniformly at 100 Hz, again corresponding to the symbol rate of modern GNSS broadcasts and consistent with the capacity of modern processors. The MEO and LEO functions are partitioned within the user equipment.

At each epoch the vector extended Kalman filter 220 constructs the nominal carrier phase and phase rate to be directed to the NCOs for each channel based on the a posteriori user position (after the Kalman filter measurement update). Space vehicle (SV) clock and ephemeris data 208 is delivered from the ground network via data link. The observation model adjusts the MEO NCO values 222 by the MEO SV clock and ephemeris correction. In the case of the LEO NCO value 224, the nominal carrier phase is based on the a posteriori user position and LEO SV orbit and clock solution.

As with the scalar receiver, the punctual PRN code for each vector channel is also wiped off by mixer 142. Complex mixers 150 and 192 and integrate and dump registers 154 and 196 respectively form the punctual in-phase and quadrature components of the residual carrier phase as follows:

$$\begin{bmatrix} I_1^{MEO} \\ Q_1^{MEO} \\ I_2^{MEO} \\ Q_2^{MEO} \\ \vdots \\ I_J^{MEO} \\ Q_J^{MEO} \\ I_1^{LEO} \\ Q_1^{LEO} \\ \vdots \\ I_K^{LEO} \\ Q_K^{LEO} \end{bmatrix}_m = \begin{bmatrix} A\cos(\Delta\phi_1) \\ A\sin(\Delta\phi_1) \\ A\cos(\Delta\phi_2) \\ A\sin(\Delta\phi_2) \\ \vdots \\ A\cos(\Delta\phi_J) \\ A\sin(\Delta\phi_J) \\ \sqrt{\epsilon}A\cos(\Delta\varphi_1) \\ \sqrt{\epsilon}A\sin(\Delta\varphi_1) \\ \vdots \\ \sqrt{\epsilon}A\cos(\Delta\varphi_K) \\ \sqrt{\epsilon}A\sin(\Delta\varphi_K) \end{bmatrix}_m + \begin{bmatrix} n_{I1} \\ n_{Q1} \\ n_{I2} \\ n_{Q2} \\ \vdots \\ n_{IJ} \\ n_{QJ} \\ n_{I1} \\ n_{Q1} \\ \vdots \\ n_{IK} \\ n_{QK} \end{bmatrix}_m$$

where $n_{Ijm}$, $n_{Qjm}$, $n_{Ikm}$, $n_{Qkm} \sim \mathcal{N}(0, \sigma_{IQ}^2)$ and A is the amplitude of the carrier, n is the discrete noise for each epoch, $\sigma_{IQ}^2$ is the noise variance.

For the MEO and LEO channels respectively, the linearized, ionosphere-free observation equations assumed for the vector tracking receiver are given as follows:

$$\Delta\phi_{jm} \cong -\hat{r}_{jm}^T \delta x_m + t_m + b_j^{MEO} + e_{jm}^{troposphere} + e_{jm}^{multipath}$$

$$\Delta\varphi_{km} \cong -\hat{r}_{km}^T \delta x_m + t_m + b_k^{LEO} + e_{km}^{troposphere} + e_{km}^{multipath}$$

where the notation for the carrier phase residual $\Delta\phi_{jm}$ and $\Delta\varphi_{km}$ represents the carrier phase residual following the NCO and complex mixers.

For simplicity of exposition and without loss of generality, LEO satellites are assumed herein to operate at a constant $C/N_0$ relative to MEO satellites, subject to the backoff parameter, $\epsilon$. The designer may define additional states to track variable amplitude signals, and the receiver automatic gain control (AGC) can be used to measure the ambient noise.

The carrier-to-noise ratios for the MEO and LEO satellites are then given as $$(C/N_0)_{MEO} \approx \frac{A^2}{2\sigma_{IQ}^2 \Delta t}$$

$$(C/N_0)_{LEO} \approx \frac{\epsilon A^2}{2\sigma_{IQ}^2 \Delta t}$$

Since the LEO $C/N_0$ values are backed off by the parameter $\epsilon$, additional coherent signal processing gain is required to discriminate the residual carrier phase angle. Supplemental summation stage 226, which may be implemented in software, further extends the time integration of the carrier phase residual also nominally by the reciprocal of the backoff, $\epsilon$.

Therefore, for the summation stage output, observations would be available at roughly 1 Hz for a backoff of 20 dB or 10 Hz for a backoff of 10 dB. The observation equations then become $$\Delta \phi'_{jm} \cong -\hat{r}_{jm}^T \delta x_m + t_m + b_j^{MEO} + e_{jm}^{troposphere} + e_{jm}^{multipath} + e_{jm}^n$$

$$\Delta \phi'_{kM} \cong -\hat{r}_{kM}^T \delta x_M + t_M + b_k^{LEO} + e_{kM}^{troposphere} + e_{kM}^{multipath} + e_{jM}^n$$

where $$e_{jm}^n, e_{jM}^n \sim N\left(0, \frac{\sigma_{IQ}^2}{A^2}\right)$$

and the prime notation signifies the post discrimination carrier phase residual for MEO signals 260 and LEO satellite signals 262. The invention may be embodied using the extended Kalman filter 220 as a dual-rate estimator. The combined MEO and LEO satellite time updates and MEO satellite measurement updates operate at 100 Hz, while the LEO satellite measurement updates operate at 10 Hz. At this point, the LEO satellite signals can be tracked as robustly as the MEO satellite signals.

The estimation process is complete when the extended Kalman filter position and MEO and LEO satellite signal carrier phase bias states converge to the centimeter level. As with the scalar implementation, convergence typically occurs within tens of seconds when the rapidly rotating line of sight unit vectors from the user to the LEO satellites span a three-dimensional space. The state estimate output 228 is the product of the vector receiver.

Refinements in the estimation process include adding one or more states associated with residual troposphere modeling. The user receiver may operate at a considerable distance from reference stations, implying that residual troposphere errors are important to attain centimeter-level positioning. Similarly, a vector receiver implementation will require all the range measurements to be consistent with the position domain solution.

Both the scalar and vector architectures are compatible with inertial measurement unit (IMU) and stable clock integration.

Initialization and Operations

Figure 5:
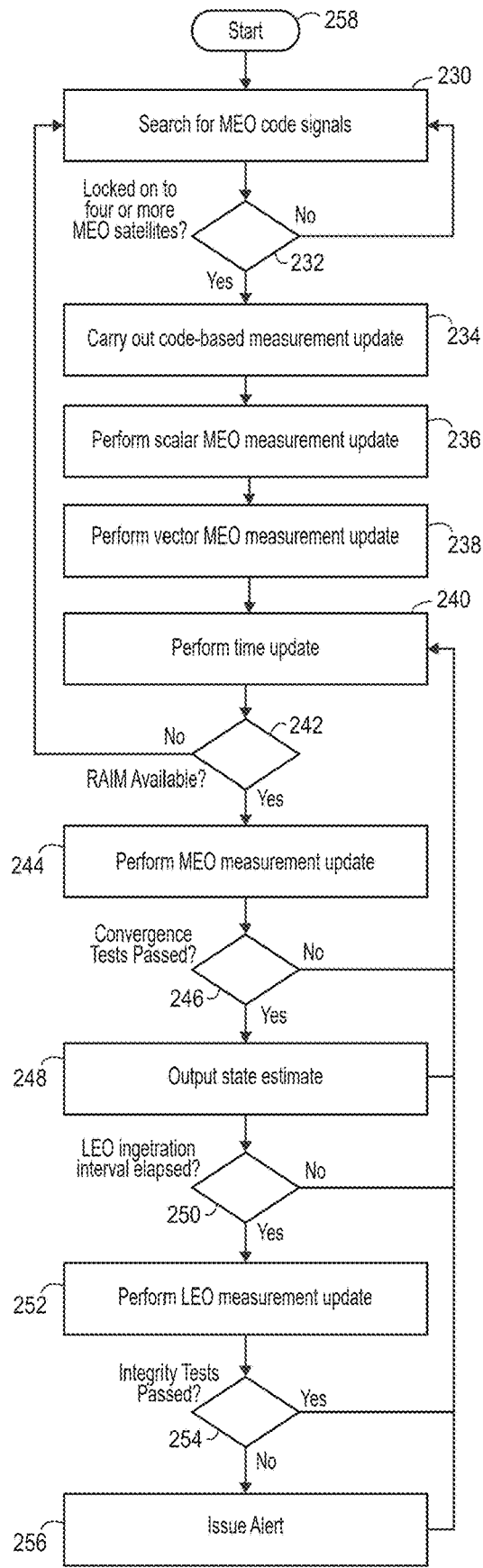
FIG. 5 shows a flow chart depicting user receiver initialization and operation.

FIG. 5 shows a flow chart depicting user receiver initialization and operation. The start block 258 initializes the state of the extended Kalman filter 228. The initialization proceeds with acquisition block 230 wherein the user receiver searches for code-based MEO signals. Upon locking onto at least four MEO satellites 232, the user receiver carries out a code-based measurement update 234 of the extended Kalman filter. Immediately thereafter, the user receiver carries out a carrier-based scalar positioning measurement update 236. These relative fixes are precise to the centimeter level, although they are biased due to the unknown carrier phase biases. Additionally, knowledge of the code-based clock estimate bounds the common-mode component of the carrier phase biases since it is otherwise unobservable. Block 238 then performs a vector positioning measurement update. Block 240 performs a time update of the Kalman filter, nominally advancing the state and covariance by 10 ms, the MEO symbol period. Decision block 242 establishes that sufficient MEO and LEO satellite geometry provides availability of Receiver Autonomous Integrity Monitoring (RAIM). If so, the user receiver proceeds to MEO measurement update block 244. If the state covariances have sufficiently converged 250, the user receiver is able to pass decision block 246 and proceed to output the state estimate 248. Every $G \approx \epsilon^{-1}$ time steps whereupon summation stage 226 has produced sufficient coherent signal processing gain, the extended Kalman filter executes a LEO measurement update 252. A crucial decision block is the integrity check 254 whereupon RAIM and other integrity checks are evaluated against the full state and covariance. If the checks fail, the receiver issues an alert 256 to the user.

The terms "comprise" or "comprising" do not exclude other elements or steps, the terms "a" or "one" do not exclude a plural number, and the term "or" means either or both, unless this application states otherwise.

While at least one exemplary embodiment of the present invention(s) is disclosed herein, it should be understood that modifications, substitutions, and alternatives may be apparent to one of ordinary skill in the art and can be made without departing from the scope of this disclosure. This disclosure is intended to cover any adaptations or variations of the exemplary embodiment(s). Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A global navigation satellite system (GNSS) receiver (102, 104, 106, 108, 110) comprising at least one processor configured to:
   track (146, 150, 154, 158, 162) a carrier component of signals received (116) from at least four medium Earth orbit (MEO) satellites (112) to produce respective tracked MEO carriers (166);
   initialize (164) a receiver position estimate, a clock bias estimate, and carrier phase bias estimates for the at least four MEO satellites (112) and for a low Earth orbit (LEO) satellite using a code component of the signals received (116) from the at least four MEO satellites (112), wherein the receiver position estimate, the clock bias estimate and the carrier phase bias estimates are collectively a state estimate (216);
   calculate (174, 178) a feed forward carrier phase (190) for the LEO satellite using:
      (i) the tracked MEO carriers (166), and
      (ii) the state estimate (216);
   reconstruct (142) a carrier component of signals received from the LEO satellite to produce a reconstructed LEO carrier (264);
   apply a coherent signal processing gain (196, 200) to a difference (194) between:
      (i) the reconstructed LEO carrier (264), and
      (ii) the feed forward carrier phase (190) to produce an integrated carrier residual (206); and
   refine (164) the state estimate (216) using:
      (i) the tracked MEO carriers (166), and
      (ii) the integrated carrier residual (206).

2. The GNSS receiver of claim 1, wherein the at least one processor is further configured to receive data indicating differential or SV clock and ephemeris data (208).

3. The GNSS receiver of claim 2, wherein the receive data is from a 5G network.

4. A GNSS receiver (102, 104, 106, 108, 110) comprising at least one processor configured to:
- externally accept or internally recall (220) a receiver position estimate, a clock bias estimate, and carrier phase bias estimates for medium Earth orbit (MEO) satellites and a low Earth orbit (LEO) satellite, wherein the receiver position estimate, the clock bias estimate and the carrier phase bias estimates are collectively a state estimate (228);
- calculate (220, 146) based on the state estimate (228) nominal MEO carrier NCO outputs (266) for respective numerically controlled oscillators (NCOs) (146) for each of the MEO satellites (112), and calculate (220, 188) a nominal LEO carrier NCO output (268) for a numerically controlled oscillator (NCO) (188) for the LEO satellite;
- produce MEO carrier residuals (270) for the MEO satellites (112) based on respective differences (150) between:
  (i) the nominal MEO carrier NCO outputs (266), and
  (ii) reconstructed (142) carrier components of signals received (116) from the MEO satellites (112);
- produce a LEO carrier residual (272) for the LEO satellite based on a difference (192) between:
  (i) the nominal LEO carrier NCO output (268), and
  (ii) a reconstructed (142) carrier component of signals received from the LEO satellite;
- apply coherent integration (154) to the respective MEO carrier residuals (270) to produce integrated MEO carrier residuals (260) and apply sustained coherent integration (196, 226) to the LEO carrier residual (272) to produce an integrated LEO carrier residual (262), wherein the sustained coherent integration (196, 226) scales an integration time of the LEO carrier residual (272) by a reciprocal of a predetermined parameter (ε) corresponding to a power flux density backoff of the LEO satellite; and
- refine (220) the state estimate (228) using the integrated MEO carrier residuals (260) and the integrated LEO carrier residual (262).

5. The GNSS receiver of claim 4, wherein the processor further implements the state estimate (228) in an extended Kalman filter.

6. The GNSS receiver of claim 5, wherein the initial externally accepted or internally recalled state estimate (228) is the refined state estimate (216) of claim 1.

7. The GNSS receiver of claim 1, wherein:
(i) the receiver position is known to be static,
(ii) the receiver is integrated with an inertial measurement unit (IMU), and/or
(iii) the receiver employs a stable frequency standard.

8. A global navigation satellite system (GNSS) receiver comprising at least one processor configured to:
- track (146, 150, 154, 158, 162) a carrier component of signals received (116) from at least four medium Earth orbit (MEO) satellites (112) to produce respective tracked MEO carriers (166);
- initialize (164) a receiver position estimate, a clock bias estimate, and carrier phase bias estimates for the at least four MEO satellites (112) and for a plurality of low Earth orbit (LEO) satellites using a code component of the signals received (116) from the at least four MEO satellites (112), wherein the receiver position estimate, the clock bias estimate, and the carrier phase bias estimates are collectively a state estimate (216);
- calculate (174, 178) a feed forward carrier phase (190) for each respective LEO satellite of the plurality of LEO satellites using:
  (i) the tracked MEO carriers (166), and
  (ii) the state estimate (216);
- reconstruct (142) a carrier component of the signals received from each respective LEO satellite of the plurality of LEO satellites to produce a reconstructed LEO carrier (264);
- apply a coherent signal processing gain (196, 200) to a difference (194) between:
  (i) each respective reconstructed LEO carrier (264), and
  (ii) each respective feed forward carrier phase (190) to produce an integrated carrier residual (206); and
- refine (164) the state estimate (216) using:
  (i) the tracked MEO carriers (166), and
  (ii) the plurality of integrated carrier residuals (206).

9. A global navigation satellite system (GNSS) receiver comprising at least one processor configured to:
- externally accept or internally recall (220) a receiver position estimate, a clock bias estimate, and carrier phase bias estimates for medium Earth orbit (MEO) satellites and low Earth orbit (LEO) satellites, wherein the receiver position estimate, the clock bias estimate and the carrier phase bias estimates are collectively a state estimate (228);
- calculate (220, 146) based on the state estimate (228) nominal MEO carrier NCO outputs (266) for respective numerically controlled oscillators (NCOs) (146) for each of the MEO satellites (112), and calculate (220, 188) nominal LEO carrier NCO outputs (268) for respective NCOs (188) for each of the LEO satellites;
- produce MEO carrier residuals (270) for the MEO satellites (112) based on respective differences (150) between:
  (i) the nominal MEO carrier NCO outputs (266), and
  (ii) reconstructed (142) carrier components of signals received (116) from the MEO satellites (112);
- produce LEO carrier residuals (272) for the LEO satellites based on respective differences (192) between:
  (i) the nominal LEO carrier NCO outputs (268), and
  (ii) reconstructed (142) carrier components of signals received from the LEO satellites;
- apply coherent integration (154) to the respective MEO carrier residuals (270) to produce integrated MEO carrier residuals (260), and apply sustained coherent integration (196, 226) to the respective LEO carrier residuals (272) to produce integrated LEO carrier residuals (262), wherein the sustained coherent integration (196, 226) scales an integration time of the LEO carrier residuals (272) by a reciprocal of a predetermined parameter (ε) corresponding to a power flux density backoff of the LEO satellites; and
- refine (220) the state estimate (228) using the integrated MEO carrier residuals (260) and the integrated LEO carrier residuals (262).

* * * * *